United States Patent
Cerny et al.

(10) Patent No.: US 10,831,956 B2
(45) Date of Patent: Nov. 10, 2020

(54) EFFICIENT EXECUTION OF ALTERNATING AUTOMATON REPRESENTING A SAFETY ASSERTION FOR A CIRCUIT

(71) Applicant: Synopsys, Inc., Mountain View, CA (US)

(72) Inventors: Eduard Cerny, Worcester, MA (US); Gerald Taylor, Portland, OR (US)

(73) Assignee: Synopsys, Inc., Mountain View, CA (US)

(*) Notice: Subject to any disclaimer, the term of this patent is extended or adjusted under 35 U.S.C. 154(b) by 456 days.

(21) Appl. No.: 15/827,202

(22) Filed: Nov. 30, 2017

(65) Prior Publication Data

US 2018/0157776 A1    Jun. 7, 2018

Related U.S. Application Data

(66) Substitute for application No. 62/429,685, filed on Dec. 2, 2016.

(51) Int. Cl.
| | |
|---|---|
| *G06F 30/33* | (2020.01) |
| *G06F 30/23* | (2020.01) |
| *G06F 30/30* | (2020.01) |
| G06F 30/17 | (2020.01) |
| G06F 30/333 | (2020.01) |
| G06F 119/18 | (2020.01) |

(52) U.S. Cl.
CPC .............. *G06F 30/33* (2020.01); *G06F 30/23* (2020.01); *G06F 30/30* (2020.01); *G06F 30/17* (2020.01); *G06F 30/333* (2020.01); *G06F 2119/18* (2020.01)

(58) Field of Classification Search
None
See application file for complete search history.

(56) References Cited

U.S. PATENT DOCUMENTS

| 9,390,208 B2 | 7/2016 | Armoni et al. |
| 2012/0151592 A1* | 6/2012 | Veanes ............... G06F 21/51 726/25 |

OTHER PUBLICATIONS

Cerny, Eduard et al. "Chapter 22: Checkers in Formal Verification", 2010, The Power of Assertions in SystemVerilog, Springer. (Year: 2010).*

(Continued)

*Primary Examiner* — Cedric Johnson
(74) *Attorney, Agent, or Firm* — Fenwick & West LLP (57) ABSTRACT

A system receive as input a circuit design and a description of the behavior of the circuit design specified as assertions. The system generates a model used for verifying that the circuit design satisfies the specified behavior. The system generates an alternating automaton representing the assertions. The alternating automaton may be non-deterministic. The system translates the alternating automaton to a finite state machine (FSM) that may be represented using a representation such as a register transfer level (RTL) representation. The system models existential transitions in the state machine using variables. As a result, the system generates fewer states in the state machine, thereby requiring significantly less memory resources for processing the assertion. The system validates the circuit design using the state machine for further design and manufacture of the circuit.

20 Claims, 7 Drawing Sheets

(56) References Cited

OTHER PUBLICATIONS

Hatchel, Gary D. et al., "Symbolic Algorithms to Calculate Steady-State Probabilities of a Finite State Machine", 1994, IEEE. (Year: 1994).*
Bergeron, J. et al. "Assertions for Formal Tools", 2006, Verification Methodology Manual for System Verilog (Year: 2006).*
Alpern, B. et al., "Recognizing Safety and Liveness," Distributed Computing, 1987, pp. 117-126, vol. 2.
Armoni, R. et al., "Efficient LTL Compilation for SAT-Based Model Checking," ICCAD '05 Proceedings of the 2005 IEEE/ACM International Conference on Computer-Aided Design, Nov. 6-10, 2005, 8 pages.
Chapter 7: Safety & Liveness Properties, © Magee/Kramer, 2004, pp. 1-59.
Korchemny, D., "Systemverilog Assertions for Formal Verification," HVC2013, Nov. 4, 2013, 118 pages.
Kupferman, O. et al., "Model Checking of Safety Properties," Oct. 15, 2010, pp. 1-27.
Loding, C. et al., "Alternating Automata and Logics Over Infinite Words," IFIP TCS 2000, LNCS 1872, J. van Leeuwen et al. (Eds.), 2000, pp. 521-535.
Miyano, S. et al., "Alternating Finite Automata on w-Words," Theoretical Computer Science, 1984, pp. 321-330, vol. 32.
Vardi, M.Y., "An Automata-Theoretic Approach to Linear Temporal Logic," 1996, 29 pages.

\* cited by examiner

EFFICIENT EXECUTION OF ALTERNATING AUTOMATON REPRESENTING A SAFETY ASSERTION FOR A CIRCUIT

CROSS REFERENCES TO RELATED APPLICATIONS

This application claims the benefit of U.S. Provisional Patent Application No. 62/429,685 filed Dec. 2, 2016, which is incorporated by reference in its entirety.

BACKGROUND

The disclosure generally relates to analysis of electronic circuits and more specifically to memory efficient circuit design tools for verification of behavior of electronic circuits specified using assertions.

State of the art electronic circuits include a very large number of components. As a result, most of the design and production of electronic circuits is computer implemented. An important part of the circuit design process is verification of behavior of a circuit specified as assertions. Conventional techniques for verification of assertions generate an alternating automaton and transform the alternating automaton to a non-deterministic automaton. The transformation from an alternating automaton to a non-deterministic automaton may require storing an exponential number of states. As a result, the computer aided design tool performing the verification process needs a very large amount of memory to be able to process the automaton. If the processor executing the computer aided design tool does not have sufficient memory to be able to process the automaton, the tool fails to perform the verification process. As a result, conventional computer aided design tools that perform verification of circuit behavior based on assertions fail to process several circuit design due to lack of memory resources required by the techniques.

SUMMARY

The above and other issues are addressed by a computer-implemented method, computer system, and computer program product for performing verification of circuit behavior specified using assertions. A circuit design and a description of the behavior of the circuit design specified as assertions is received as input. A model is generated and used for verifying that the circuit design satisfies the specified behavior. The system determines that the assertion represents a safety property. The system generates an alternating automaton based on the property. The system transforms the alternating automaton to a finite state machine by modeling existential transitions (OR transitions) using free variables. The use of the free variable prevents the increase in the number of states encountered during transformation of alternating automaton to a finite state machine. The system provides the finite state machine to a model checker for verification.

In an embodiment, the existential transition from a particular state includes a pair of branches, each causing a transition from the particular state to another state. The system models the existential transition using a free variable to select the first branch of the existential transition and a negation of the free variable to select the second branch of the existential transition.

In an embodiment, the representation of the finite state machine is generated using a register transfer language (RTL).

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

DETAILED DESCRIPTION

Embodiments generate a model representing behavior of a circuit that can be processed by a formal model checker. Example models used for illustration use a synchronous Verilog Register Transfer Level (RTL) representation, but can use any other similar form such as a Data Flow Graph, And-Invert Gate model, etc. The circuit design may be specified using RTL, a gate level description, or another syntax for specifying the circuit design. The assertions describing the behavior of the circuit design may be specified using a language such as SystemVerilog (SVA) or PSL.

An assertion specifies a behavior of the system. Assertions can be used to validate the behavior of a design. An assertion represents a positive statement about a property of a circuit design. A positive statement is a statement that indicates an error if the statement is determined to be false. The assertions include safety assertions. A safety assertion fails if it is possible for the circuit to start from an initial state and reach a bad state. For example, the circuit design tool may generate a negation of the assertion that represents a failure state. The circuit design tool generates a state machine that reaches a final state if the negation of the assertion is true, i.e., the assertion fails.

A circuit design tool translates a safety property into an automaton, for example, an alternating Büchi automaton. The automaton size is linear in the length of the property, i.e., linear in the number of operators and delay/repetition ranges. However, the automaton for a typical model checker is a non-deterministic finite automaton, such that when the accepting state of the automaton is reached, an assertion on the property fails and a cover succeeds. The transformation of an alternating automaton to a non-deterministic one is of exponential complexity. The exponential complexity is due to the removal of universal transitions in the alternating automaton using a construction method that explores all reachable subsets of the automaton state space.

Embodiments generate a model based on the circuit design and the assertions without generating a very large number of states. Embodiments translate the alternating automaton directly to a finite state machine (FSM). Examples illustrated herein describe the FSM implementation using Verilog RTL. The advantage of these embodiments is that the size of the RTL is linear in the size of the property, like the size of the alternating automaton, thus avoiding the exponential blow up of the automaton representation and storage/memory requirements. The complexity of the processing is pushed to the model checking stage. The removal of the "universal" transitions as well as the determinization happen "on the fly" during the evaluation of the automaton on a signal trace. In other words, the determinization is performed such that there is no increase in the complexity of the automaton structure, but the determinization is handled implicitly by a model checker.

Overview of EDA Design Flow

Figure 1:
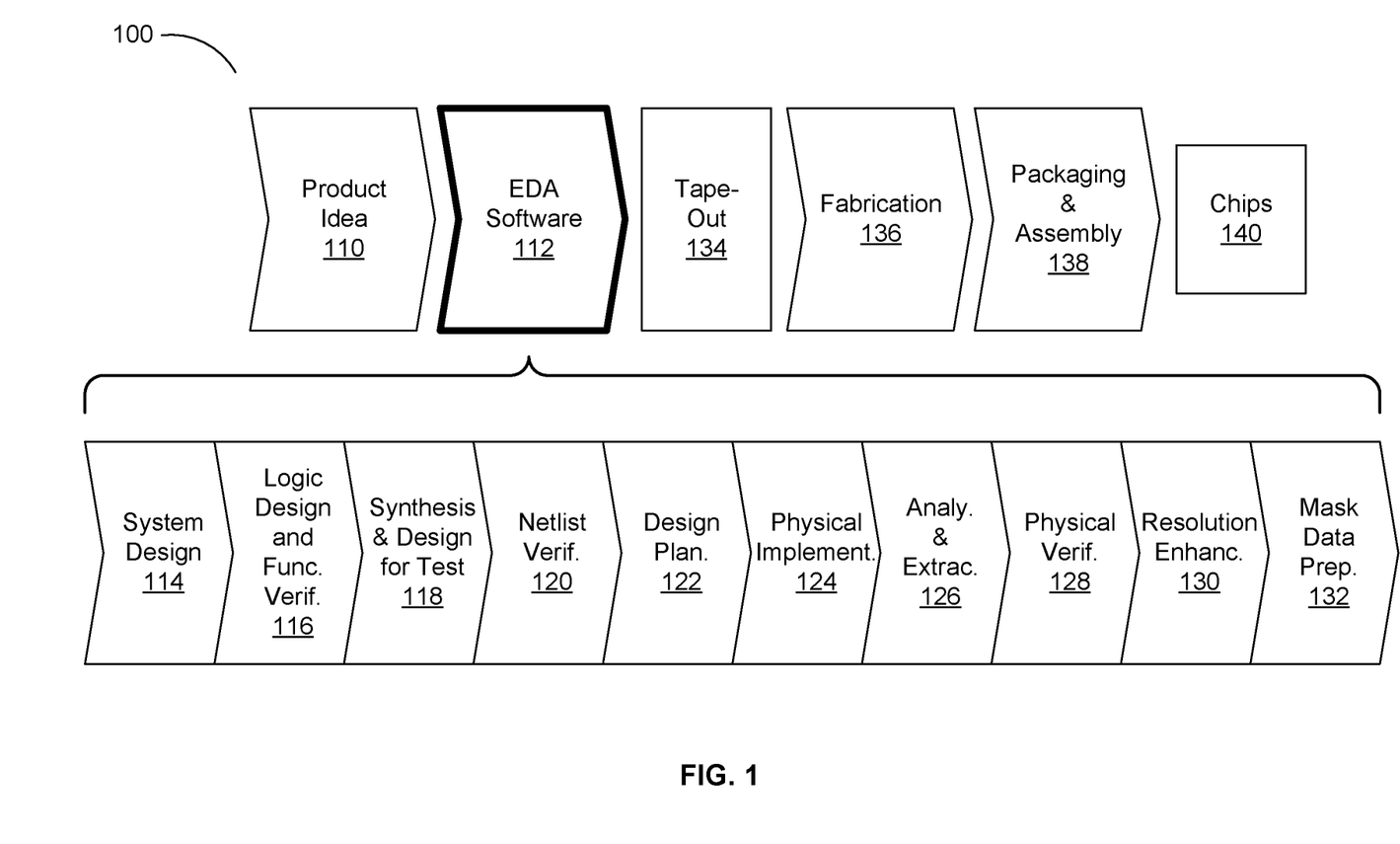
FIG. 1 is a flowchart illustrating various operations in the design and fabrication of an integrated circuit.

This section describes various stages in the EDA (electronic design automation) flow. FIG. 1 is a flowchart 100 illustrating the various operations in the design and fabrication of an integrated circuit. This process starts with the generation of a product idea 110, which is realized during a design process that uses electronic design automation (EDA) software 112. When the design is finalized, it can be taped-out 134. After tape-out, a semiconductor die is fabricated 136 to form the various objects (e.g., gates, metal layers, vias) in the integrated circuit design. Packaging and assembly processes 138 are performed, which result in finished chips 140.

The EDA software 112 may be implemented in one or more computing devices such as the computer 1000 of FIG. 10. For example, the EDA software 112 is stored as instructions in the computer-readable medium which are executed by a processor for performing operations 114-132 of the design flow, which are described below. This design flow description is for illustration purposes. In particular, this description is not meant to limit the present disclosure. For example, an actual integrated circuit design may require a designer to perform the design operations in a difference sequence than the sequence described herein.

During system design 114, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During logic design and functional verification 116, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, 10 Designware®, VC Static® and VC Formal®, Formality®, ESP® and Leda® products.

During synthesis and design for test 118, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 120, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 122, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 124, the placement (positioning of circuit elements) and routing (connection of the same) occurs. Example EDA software products from Synopsys, Inc. of Mountain View, Calif. that can be used at this stage include: the Astro® and IC Compiler® products.

During analysis and extraction 126, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products.

During physical verification 128, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 130, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 132, the 'tape-out' data for production of masks to produce finished chips is provided. Example EDA software products from Synopsys, Inc. of Mountain View, Calif. that can be used at this stage include the CATS® family of products.

Embodiments perform the analysis of the circuit using EDA software 112 at the stage of logic design and functional verification 116. For example, the analysis is performed using an RTL specification of a circuit and a description of expected behavior of the circuit specified as assertions describing various properties of the circuit. Embodiments comprise circuit design tools that verify the behavior of the design before the RTL specification is converted to another lower level representation, for example, gate level representation. The gate level representation is further mapped to layout for the circuit being designed. The layout of the circuit is used for manufacture of the circuit via a fabrication process. The fabrication process generates a physical implementation of the circuit, for example, an integrated circuit.

System Architecture

Figure 2:
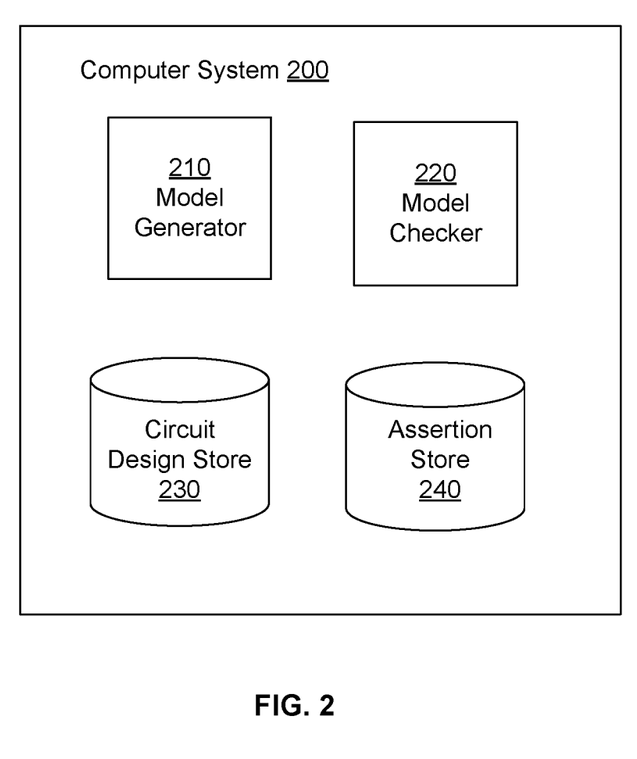
FIG. 2 illustrates the system architecture for generating a model for a model checker based on the circuit design and assertions, according to an embodiment.

FIG. 2 illustrates the system architecture for generating a model for a model checker based on the circuit design and assertions, according to an embodiment. The computer architecture illustrated in FIG. 2 comprises a computer system 200 including a model generator 210, a model checker 220, a circuit design store 230, and an assertion store 240. Other embodiments may have more or fewer modules than those indicated herein. The computer system 200 is also referred to herein as the system.

The circuit design store 210 stores the information describing the input circuits, for example, an RTL description of the circuit. The assertion store 240 stores assertions associated with circuit designs stored in the circuit design store 210. The model generator 210 executes the processes illustrated herein to generate a model based on an input circuit description and the assertions and stores the generated model in the model store 250. The model generator 210 provides the generated model to the model checker 220. The model checker 220 acts as a verification tool and verifies the model.

In one embodiment, the computer system 200 can be a conventional computer system executing, for example, a Microsoft Windows-compatible operating system (OS), Apple OS X, and/or a Linux distribution. Some embodiments of the computer system 200 have different and/or other modules than the ones described herein, and the functions can be distributed among the modules in a different manner than described here. For example, the computer system 200 might also include modules for receiving electronic circuit information via a network or modules for transmitting results via the network.

Embodiments perform reduction of the size of the representation of the automaton of the assertions as needed by the verification tool—the model checker 220. A simple transformation of the alternating automaton leads to a direct implementation of the automaton as an FSM in RTL. The result is at the limit an exponential reduction in the number of state variables and thus a reduced memory requirement to store and manipulate the assertion model. It yields a better compile-time performance when transforming an SVA/PSL assertion to RTL for model checking.

The system 200 allows users to write SVA (System Verilog Assertions) or PSL (Property Specification Language) properties that have much larger delay/repetition ranges than if the explicit elimination of the universal transitions were used. Large delays are quite common when dealing with designs for communication networks due to large packet sizes and complex interface protocols with large latencies. Without the embodiments, such assertions could not be compiled and consequently would most likely be ignored by the verification tool. The model checking processes according to the embodiments are efficient in dealing with the automaton evaluation such that even on full proofs of the assertion the actual run time is not a limiting factor. The techniques disclosed are used as an assert property statement or a cover property statement.

Overall Process

The process is illustrated using a SystemVerilog Assertion example:

A: assert property(@(posedge clk) a|=>(b ##[0:2] c) and d);

The above statement specifies that whenever a is true at a clock tick of (posedge clk) then at the next clock tick b must be true followed by c within 0 to 2 clock ticks, and at the same time as b is true, d must be true as well.

Figure 3A:
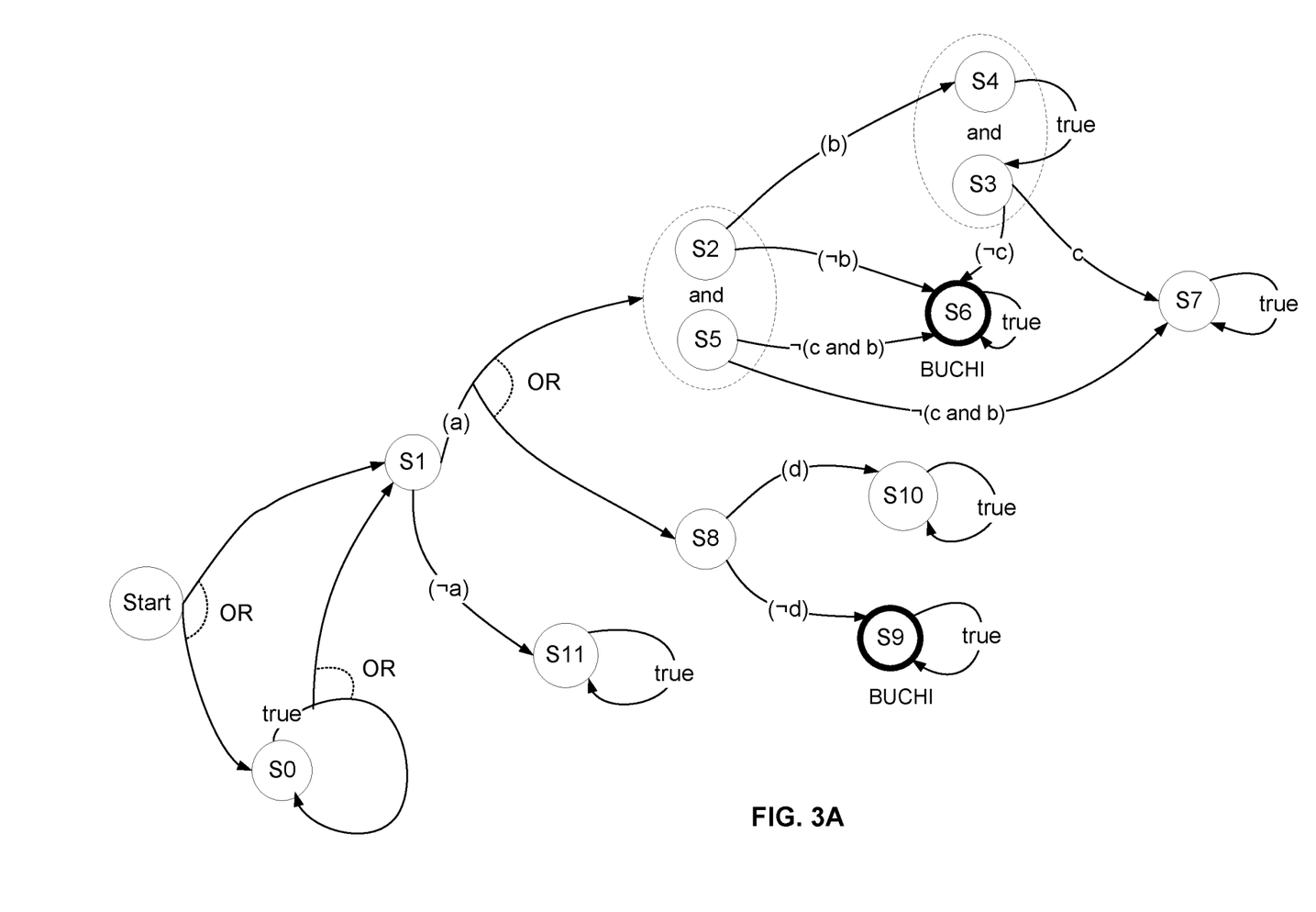
FIGS. 3A-D show example automatons and portions of automatons for illustrating the processes described herein.

According to an embodiment, the system 200 generates an alternating automaton for the property in the assertion, "a|=>(b ##[0:2] c) and d", and then applies the operation "always" to ensure that the property holds starting at every clock tick. Finally, since it is an assertion and the system is looking for failures, system 200 applies negation to the property, i.e., the operator "not". The effective property for which the alternating automaton is built becomes "not always (a|=>(b ##[0:2] c) and d)". The effective property causes a failure to be detected if it is not the case that the original property always holds. FIG. 3 shows an example automaton corresponding to this effective property for illustrating the processes described herein.

The alternating automaton shown in the examples use the following notation. States are Si and each state has a set of outgoing transitions. A transition includes an enabling condition followed by an arrow pointing to a positive Boolean expression over the states. (OR) represent an existential transition and (AND) a universal transition of the alternating automaton.

For instance, in the automaton shown in FIG. 3, there are two transitions exiting state S1. The first one has the condition a and when true the automaton non-deterministically chooses to go to state S8 or to both states S2 and S5. The second transition is enabled by not a, i.e., a being false (represented as ¬a), and this transition leads to state S11. That state represents a vacuous situation in the evaluation of the implication |=>, i.e., meaning that the consequent (the right-hand side) of |=> is not activated.

The initial state of the alternating automata shown in FIG. 3 corresponds to a non-deterministic choice between S0 and S1. S1 is the starting state for an evaluation attempt of the property, while S0 with its self-loop represents the advancement to the next evaluation attempt at the next clock tick.

The (AND) transitions from S1 and from S5 with states S2, S3 and S4 correspond to the evaluation of the subexpression (b ##[0:2] c). The choice in S1 to go to S8 represents the evaluation of d. In other words, for the property to fail either d is false or the subexpression (b ##[0:2] c) is false.

The system detects assertion failure of an evaluation attempt if state S6 or state S9 is reached (or both are reached), while no state other than these and the vacuous state S11 has a pending transition.

States S6 and S9 are the Büchi accepting states. Once the accepting state is reached the process is stuck—there is no transition to another state. They are terminal as well as Büchi states which is an indication that the property is a safety property. There must be no Büchi state with an exiting transition to another state and a selfloop.

In the explicit removal of universal transitions, a reachability based subset construction is performed such that whenever an AND transition is encountered, the pair of states becomes part of the next state subset. Consequently, the maximum number of possible states is at most the number of subsets of the set of states (here $2^{12}$). Since there are only two AND transitions, the number of subsets generated by the procedure is far less, but if the range of the delay is increased, the number of AND transitions will grow and so will the size of the resulting non-deterministic automaton.

To avoid the explicit removal of universal transitions, direct implementation of the slightly modified alternating automaton is based on the following observations: for safety properties, the accepting Büchi states are terminal (with a self-loop).

Given a single evaluation attempt on a signal value trace, the automaton progresses by making non-deterministic choices when evaluating OR transitions, eventually reaching terminal state(s).

If the terminal states are the accepting state(s) and no other state transition is still in progress (other than to the vacuous state), then a failure of the assertion on the trace is established. Accordingly: (1) For a given trace, start a single evaluation attempt, its start time selected non-deterministically. (2) For each existential transition, only one branch must be non-deterministically selected. (3) Failure is detected if the evaluation attempt brings the automaton to only the accepting states (and perhaps the vacuous state).

To translate the conditions to deterministic FSM in RTL, the system 200 achieves non-deterministic choices by using selection variables that are "free" as far as the model-checking engines are concerned. A free variable is declared, but not assigned. The execution engines are thus "free" to choose a value of the variable at every clock tick.

Figure 3B:
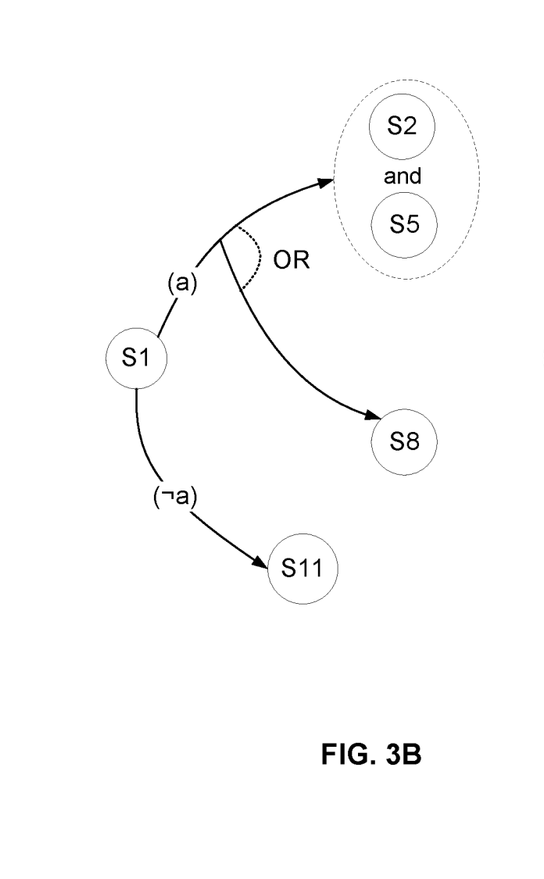
Figure 3C:
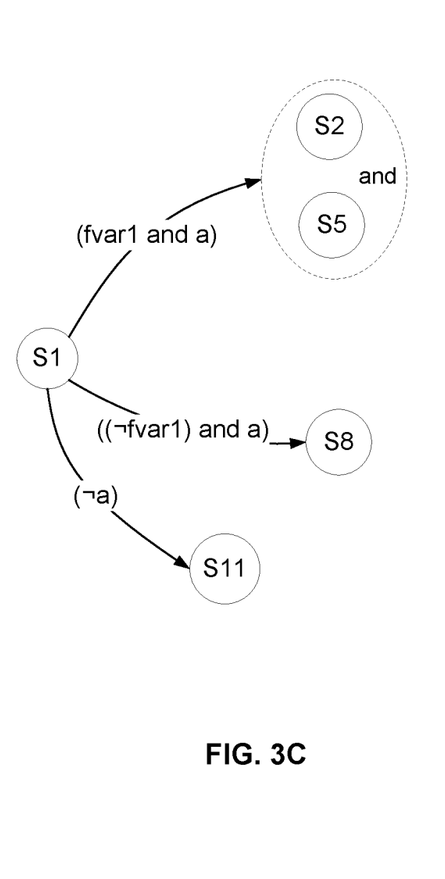

The self-loop on the initial state is removed since the repeated evaluation is achieved by using a Verilog always procedure. In the example, the removal results in a single initial state. The state transitions corresponding to the state S1 are illustrated in FIG. 3B. OR transitions are split into two, one controlled by a free variable (named fvar1) and the other by the negation of the free variable, by conjoining them to the enabling condition. For instance the transitions from state S1 as a result of the transition are as illustrated in FIG. 3C. Accordingly, a transition from S1 to S2 and S5 is enabled by (fvar1 and a), a transition from S1 to S8 is enabled by ((not fvar1) and a), and a transition from S1 to S11 is enabled by (not a).

To implement the trigger of a single evaluation attempt of the assertion, the system uses a free variable to start the evaluation. The system generates a set of instructions to implement the trigger using a language, for example, a hardware description language such as Verilog. The following is an example of the generated set of instructions.

```
bit freeVar;
bit setAndHold; // initialized to false (0)
always @(posedge clk)
    setAndHold <= freeVar || setAndHold;
wire triggerAttempt = freeVar && ! setAndHold;
```

When freeVar becomes true, it sets triggerAttempt to true and setAndHold to true at the next clock cycle which inhibits triggerAttempt to become true again in the future.

In some embodiments, the system generates a set of instructions that obtain a similar effect by instrumenting an SVA assumption (constraint) on the triggerAttempt variable as follows:

```
bit triggerAttempt;
SingleAttempt: assume property(@(posedge clk)
    triggerAttempt |=> always !triggerAttempt);
```

Figure 3D:
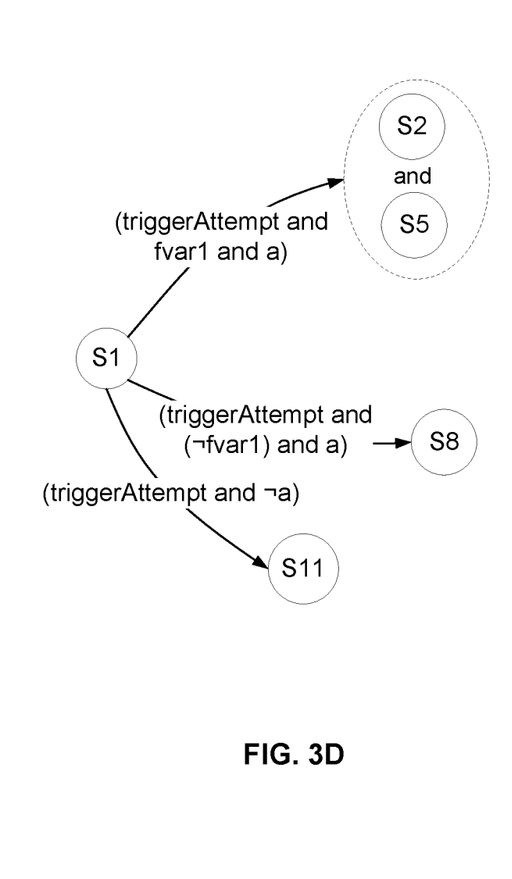

Finally, the system generates instructions to conjoin triggerAttempt with the enabling condition of every transition exiting an initial state. In the above example, there is only one initial state, S1 as discussed earlier. The transitions from state S1 are shown in FIG. 3D. The transition from S1 to S2 and S5 is enabled by (triggerAttempt and freeVar1 and a). The transition from S1 to S8 is enabled by (triggerAttempt and not freeVar1 and a). The transition from S1 to S9 is enabled by (triggerAttempt and not a).

Since there is no other OR transition in the example automaton, the rest of its structure remains unchanged. At the cost of two free variables, the system converts the alternating automaton in the example to an FSM in Verilog RTL. The system achieves this by disjoining transitions leading to a state and assigning the resulting expression to that state. The RTL of the example takes the following form:

```
bit [2:10] S; // initialized to 'b0
always @(posedge clk) begin
    S[2] <= (triggerAttempt && (freeVar_1 && a));
    S[3] <= ((S[2] && b) ||
        S[4]);
    S[4] <= (S[2] && b);
    S[5] <= (triggerAttempt && (freeVar_1 && a));
    S[6] <= ((((S[2] && (!b)) ||
        (S[3] && (!c))) ||
            (S[5] && (!(c && b)))) ||
        S[6]);
    S[7] <= (((S[3] && c) ||
        (S[5] && (c && b))) ||
        S[7]);
    S[8] <= (triggerAttempt && (freeVar_1 && a));
    S[9] <= ((S[8] && (!d)) ||
        S[9]);
    S[10] <= ((S[8] && d) ||
        S[10]);
end
```

Notice that state S[1] is removed because there is no transition leading to it. Also, the vacuous state S[11] was removed because it is not needed for detecting assertion failure.

The system further computes a signal that indicates that a failure is detected. The system detects that at least one of the accepting states is reached and no other state transition is in progress (i.e., no other state variable is set). The system implements this by intersecting the state vector with a mask that selects only the non-accepting states, and conjoining with the requirement that at least one state is set to 1. In the example, the system generates the following wire assignment:

wire failed=((S & 9'b111101101)==9'b000000000) && !(S==9'b000000000);

The 0's in the first mask (i.e., 9'b111101101) are aligned with S[6] and S[9] which are the accepting states. When "failed" is true (set to 1'b1), a failure of the evaluation attempt on a trace is detected. The above RTL is just one possible form to illustrate the concepts. To illustrate the reduction in the size of the required number of states and thus the size of the RTL, consider the assertion:

A: assert property(@(posedge clk) a|=>(b ##[0:N] c ##[0:N] d));

The following table shows number of states for increasing values of N as shown in column A for this assertion.

TABLE I

| | Number of states | |
|---|---|---|
| Column A<br>N | Column B<br>Explicit removal of<br>AND transitions | Column C<br>Alternating automaton RTL<br>(# free variables) |
| 2 | 9 | 11 (2) |
| 3 | 14 | 13 (2) |
| 4 | 24 | 15 (2) |
| 5 | 44 | 17 (2) |
| 10 | 1200 | 27 (2) |
| 12 | >4000 aborted | 31 (2) |

As shown above, the number of states without use of embodiments of the invention increases exponentially with the increase in N as shown in column B. In contrast, embodiments of the invention use free variables thereby processing the assertion with fewer number of states as shown in column C.

Overall Process

Figure 4:
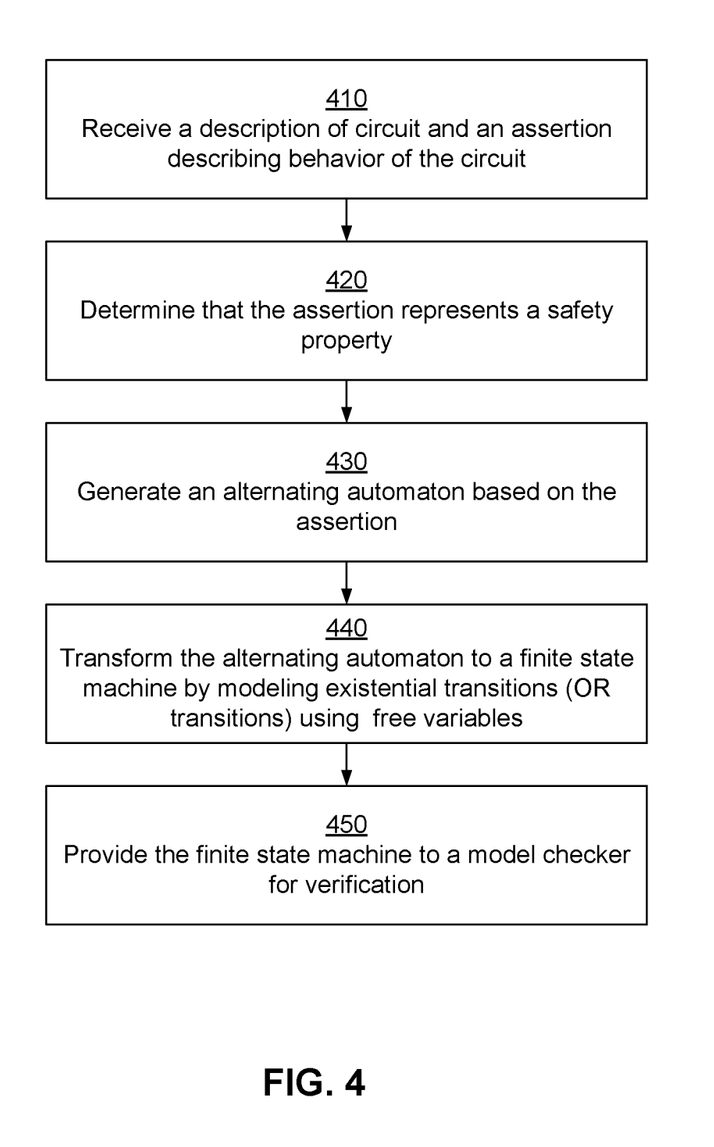
FIG. 4 illustrates the overall process for verification of assertions representing behavior of a circuit, according to an embodiment of the invention.

FIG. 4 illustrates the overall process for verification of assertions representing behavior of a circuit, according to an embodiment of the invention. The system receives 410 a description of circuit and an assertion describing behavior of the circuit. The system determines 420 that the assertion represents a safety property. The system generates 430 an alternating automaton based on the property. The system transforms 440 the alternating automaton to a finite state machine by modeling existential transitions (OR transitions) using free variables. The system provides 450 the finite state machine to a model checker for verification. If the circuit design is validated and approved by the model checker, the circuit design may be further modified by other tools or used to generate other representations of the circuit, for example, layout of the circuit using placement and routing tools. The circuit design is processed and finally sent for fabrication of a circuit based on the circuit design.

Figure 5:
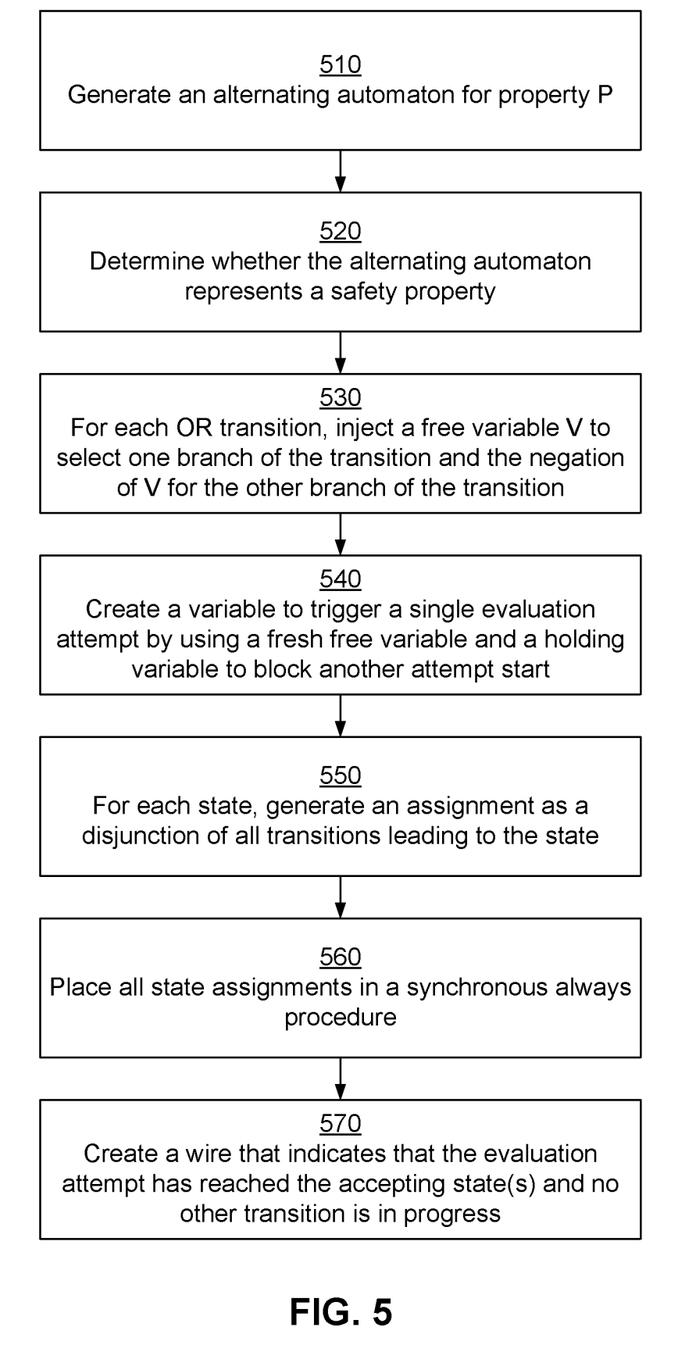
FIG. 5 illustrates a process for verification of assertions representing behavior of a circuit, according to another embodiment of the invention.

FIG. 5 illustrates a process for verification of assertions representing behavior of a circuit, according to another embodiment of the invention. The system generates 510 an alternating automaton for property P. The system determines 520 whether the alternating automaton represents a safety property. The detection of the safety property can be done either on the alternating automaton, once constructed, or by analyzing the property before the construction of the automaton. If the system determines that the property is not a safety property, the system skips the property from further analysis shown below. For each OR transition, the system injects 530 a fresh free variable to select one branch of the transition and the negation of the free variable the other branch of the transition. This is done by splitting the original transition into two and by conjoining the free variable (respectively, its negation) with the enabling condition of the transition. The system creates 540 a variable to trigger a single evaluation attempt by using a fresh free variable and a holding variable to block another attempt start. The system collects 550, for each state, all transitions leading to the state and converts each to Verilog syntax and forms a disjunction. The result is the right-hand side of an assignment to the state. The system places 560 all such state assignments in a synchronous always procedure. The system creates 570 a wire statement that indicates that the evaluation attempt has reached the accepting state(s) and no other transition is in progress. Other embodiments execute similar procedure for other representations than Verilog RTL.

Computer Architecture

Figure 6:
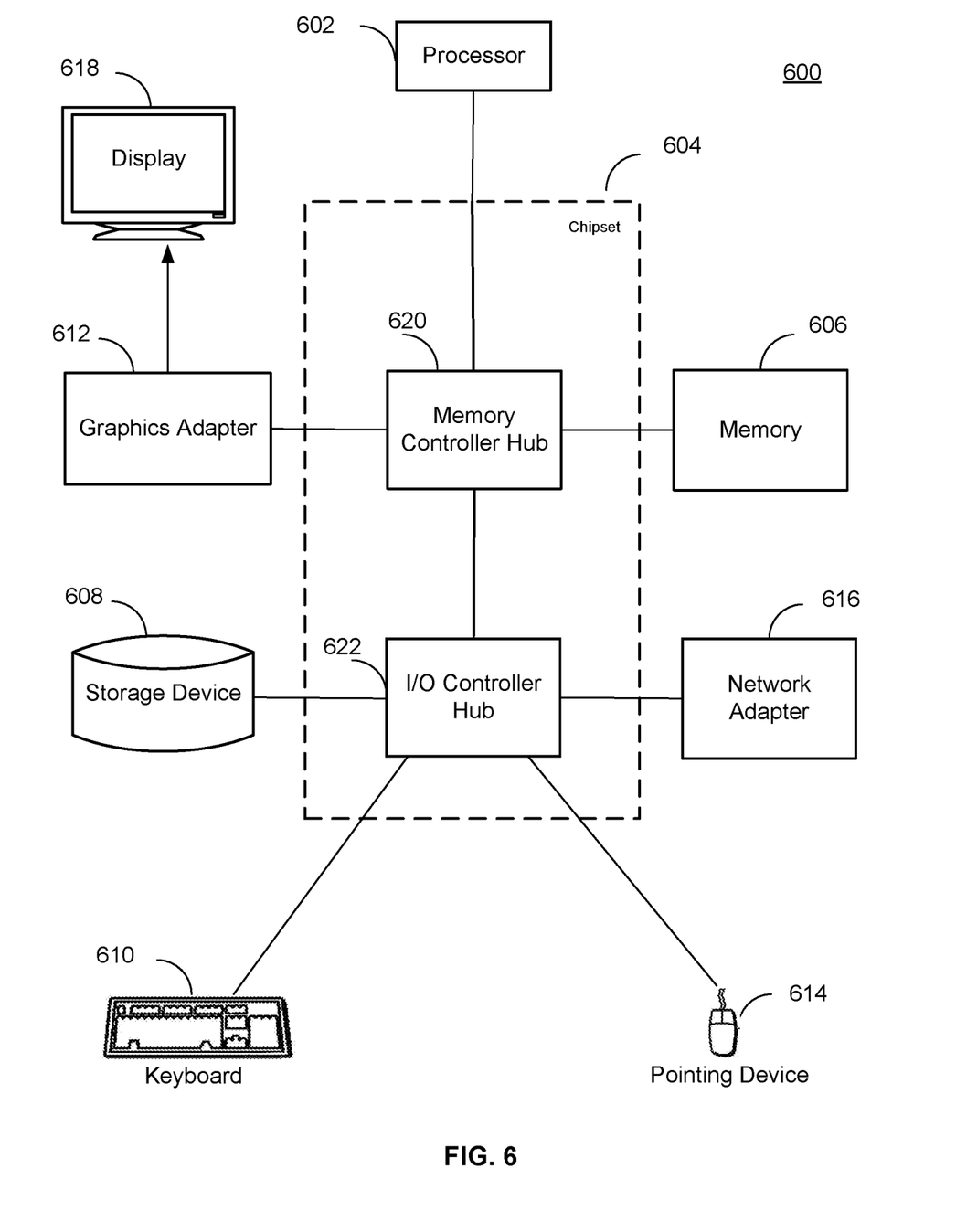
FIG. 6 is a high-level block diagram illustrating an example of a computer for use by embodiments, in accordance with an embodiment.

FIG. 6 is a high-level block diagram illustrating an example of a computer for use in compression of scenarios, in accordance with an embodiment. The computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

The storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, or other type of pointing device, and is used in combination with the keyboard 610 to input data into the computer system 600. The graphics adapter 612 displays images and other information on the display 618. The network adapter 616 couples the computer system 600 to one or more computer networks.

The computer 600 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 608, loaded into the memory 606, and executed by the processor 602. The types of computers 600 used can vary depending upon the embodiment and requirements. For example, a computer may lack displays, keyboards, and/or other devices shown in FIG. 6.

Alternative Embodiments

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating models comprising a finite state machine based on a circuit description and assertions describing the circuit. Thus, while particular embodiments and applications have been illustrated and described, it is to be understood that the embodiments are not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for analysis of safety properties of a circuit, the method comprising:
   receiving a circuit design for a circuit and an assertion describing behavior of the circuit;
   determining that the assertion represents a safety property;
   responsive to determining that the assertion represents a safety property, generating an alternating automaton based on the assertion;
   transforming the alternating automaton to a finite state machine, the transformation comprising, generating a representation of the finite state machine that models an existential transition using a free variable;
   providing the finite state machine to a model checker for verification; and
   responsive to the model checker validating the assertion, providing the circuit design for further design and manufacture of the circuit.

2. The computer-implemented method of claim 1, wherein the existential transition comprises a first branch and a second branch, and wherein modeling the existential transition using a free variable comprises using the free variable to select the first branch of the existential transition and a negation of the free variable to select the second branch of the existential transition.

3. The computer-implemented method of claim 1, wherein the free variable is a first free variable, further comprising:
   representing triggering of a single evaluation attempt by using a second free variable.

4. The computer-implemented method of claim 3, further comprising:
   injecting a holding variable in the model to block a second evaluation attempt.

5. The computer-implemented method of claim 1, further comprising:
   identifying all transitions leading to a particular state; and
   generating an expression representing a disjunction based on all transitions leading to the particular state.

6. The computer-implemented method of claim 1, further comprising
   adding to the representation of the finite state machine, a statement indicating that an evaluation attempt has reached the accepting state and no other transition is in progress.

7. The computer-implemented method of claim 1, wherein the representation of the finite state machine is based on a register transfer language (RTL).

8. A non-transitory computer readable storage medium storing instructions that when executed by a computer processor cause the computer processor to perform steps comprising:
   receiving a circuit design for a circuit and an assertion describing behavior of the circuit;
   determining that the assertion represents a safety property;
   responsive to determining that the assertion represents a safety property, generating an alternating automaton based on the assertion;
   transforming the alternating automaton to a finite state machine, the transformation comprising, generating a representation of the finite state machine that models an existential transition using a free variable;
   providing the finite state machine to a model checker for verification; and
   responsive to the model checker validating the assertion, providing the circuit design for further design and manufacture of the circuit.

9. The non-transitory computer readable storage medium of claim 8, wherein the existential transition comprises a first branch and a second branch, and wherein modeling the existential transition using a free variable comprises injecting the free variable to select the first branch of the existential transition and a negation of the free variable to select the second branch of the existential transition.

10. The non-transitory computer readable storage medium of claim 8, wherein the free variable is a first free variable, wherein the stored instructions further cause the computer processor to:
    represent triggering of a single evaluation attempt by using a second free variable.

11. The non-transitory computer readable storage medium of claim 10, wherein the stored instructions further cause the computer processor to:
    inject a holding variable in the model to block a second evaluation attempt.

12. The non-transitory computer readable storage medium of claim 8, wherein the stored instructions further cause the computer processor to:
    identify all transitions leading to a particular state; and
    generate an expression representing a disjunction based on all transitions leading to the particular state.

13. The non-transitory computer readable storage medium of claim 8, wherein the stored instructions further cause the computer processor to:
    add to the representation of the finite state machine, a statement indicating that an evaluation attempt has reached the accepting state and no other transition is in progress.

14. The non-transitory computer readable storage medium of claim 8, wherein the representation of the finite state machine is based on a register transfer language (RTL).

15. A computer-implemented system for analysis of safety properties of a circuit, the system comprising:
    a computer processor; and
    a computer-readable storage medium storing instructions that cause the computer processor to perform steps comprising:
      receiving a circuit design for a circuit and an assertion describing behavior of the circuit;
      determining that the assertion represents a safety property;
      responsive to determining that the assertion represents a safety property, generating an alternating automaton based on the assertion;

transforming the alternating automaton to a finite state machine, the transformation comprising, generating a representation of the finite state machine that models an existential transition using a free variable;

responsive to the model checker validating the assertion, providing the circuit design for further design and manufacture of the circuit.

16. The computer-implemented system of claim 15, wherein the existential transition comprises a first branch and a second branch, and wherein modeling the existential transition using a free variable comprises injecting the free variable to select the first branch of the existential transition and a negation of the free variable to select the second branch of the existential transition.

17. The computer-implemented system of claim 15, wherein the free variable is a first free variable, wherein the stored instructions further cause the computer processor to:
represent triggering of a single evaluation attempt by using a second free variable.

18. The computer-implemented system of claim 17, wherein the stored instructions further cause the computer processor to:
inject a holding variable in the model to block a second evaluation attempt.

19. The computer-implemented system of claim 15, wherein the stored instructions further cause the computer processor to:
identify all transitions leading to a particular state; and
generate an expression representing a disjunction based on all transitions leading to the particular state.

20. The computer-implemented system of claim 15, wherein the stored instructions further cause the computer processor to:
add to the representation of the finite state machine, a statement indicating that an evaluation attempt has reached the accepting state and no other transition is in progress.

* * * * *